US012811444B2

(12) United States Patent
Rosen et al.

(10) Patent No.: US 12,811,444 B2
(45) Date of Patent: Nov. 24, 2026

(54) STATOR FOR A RADIAL FLUX DOUBLE-ROTOR MACHINE, RADIAL FLUX DOUBLE-ROTOR MACHINE AND METHOD FOR PRODUCING A STATOR FOR A RADIAL FLUX DOUBLE-ROTOR MACHINE

(71) Applicant: DeepDrive GmbH, Garching bei München (DE)

(72) Inventors: Alexander Rosen, Osnabrueck (DE); Dean Petrovski, Munich (DE)

(73) Assignee: DeepDrive GmbH, Garching bei München (DE)

( * ) Notice: Subject to any disclaimer, the term of this patent is extended or adjusted under 35 U.S.C. 154(b) by 412 days.

(21) Appl. No.: 18/573,550

(22) PCT Filed: Jul. 14, 2022

(86) PCT No.: PCT/EP2022/069784
§ 371 (c)(1),
(2) Date: Dec. 22, 2023

(87) PCT Pub. No.: WO2023/006440
PCT Pub. Date: Feb. 2, 2023

(65) Prior Publication Data
US 2024/0322619 A1 Sep. 26, 2024

(30) Foreign Application Priority Data
Jul. 29, 2021 (DE) ..................... 10 2021 003 942.4

(51) Int. Cl.
*H02K 1/16* (2006.01)
*H02K 3/28* (2006.01)
(Continued)

(52) U.S. Cl.
CPC ............... *H02K 1/165* (2013.01); *H02K 3/28* (2013.01); *H02K 3/48* (2013.01); *H02K 9/227* (2021.01);
(Continued)

(58) Field of Classification Search
CPC ............ H02K 1/165; H02K 3/28; H02K 3/48; H02K 9/227; H02K 15/021; H02K 15/085;
(Continued)

(56) References Cited

U.S. PATENT DOCUMENTS 3,360,668 A 12/1967 Fritz
3,441,761 A 4/1969 Painton et al.
(Continued)

FOREIGN PATENT DOCUMENTS

CN 1945939 A 4/2007
CN 108418368 A 8/2018
(Continued)

OTHER PUBLICATIONS

Ponick, B. et al., "Calculation of electrical machines," ISBN:978352740525, 2008 Wiley-VCH Verlag GmbH & Co KGaA (only english abstract available).
(Continued)

*Primary Examiner* — Rashad H Johnson
(74) *Attorney, Agent, or Firm* — Westman, Champlin & Koehler, P.A.

(57) ABSTRACT

The present invention relates to a stator for a radial flux double-rotor machine, in particular for a wheel hub motor. The stator includes a stator core; a winding which is placed in the stator core and is designed to be self-supporting for torque support of the stator, wherein the winding protrudes beyond the stator core at least one axial end; and a support device which is arranged axially offset with respect to the
(Continued)

stator core and is designed for form-fitting engagement with the winding at the at least one axial end for torque support.

23 Claims, 10 Drawing Sheets

(51) Int. Cl.
*H02K 3/48* (2006.01)
*H02K 9/22* (2006.01)
*H02K 15/021* (2025.01)
*H02K 15/085* (2006.01)
*H02K 16/02* (2006.01)

(52) U.S. Cl.
CPC ......... *H02K 15/021* (2025.01); *H02K 15/085* (2013.01); *H02K 16/02* (2013.01); *H02K 2201/06* (2013.01); *H02K 2203/09* (2013.01); *H02K 2213/03* (2013.01)

(58) Field of Classification Search
CPC ............... H02K 16/02; H02K 2201/06; H02K 2203/09; H02K 2213/03
USPC .................................................. 310/112, 114
See application file for complete search history.

(56) References Cited

U.S. PATENT DOCUMENTS

| | | | | |
|---|---|---|---|---|
| 6,557,239 | B2 | 5/2003 | Takahashi et al. | |
| 6,694,598 | B2 | 2/2004 | Takahashi et al. | |
| 6,759,781 | B1 * | 7/2004 | Bushko | H02K 3/47 310/179 |
| 6,992,419 | B2 | 1/2006 | Kim et al. | |
| 7,135,800 | B2 * | 11/2006 | Yamada | H02K 29/03 310/268 |
| 7,356,906 | B2 | 4/2008 | Kim et al. | |
| 7,402,934 | B1 * | 7/2008 | Gabrys | H02K 3/47 310/179 |
| 7,443,074 | B2 | 10/2008 | Kim et al. | |
| 7,462,968 | B2 * | 12/2008 | Kusase | H02K 21/22 310/201 |
| 7,557,486 | B2 | 7/2009 | Choi et al. | |
| 7,626,299 | B2 | 12/2009 | Yoshikawa et al. | |
| 7,652,406 | B2 | 1/2010 | Kim et al. | |
| 8,541,923 | B2 | 9/2013 | Leiber et al. | |
| 10,050,480 | B2 | 8/2018 | Köhler et al. | |
| 10,381,886 | B2 | 8/2019 | Gieras et al. | |
| 11,496,026 | B2 | 11/2022 | Tsuda et al. | |
| 2001/0007169 | A1 | 7/2001 | Takahashi et al. | |
| 2003/0005579 | A1 | 1/2003 | Takahashi et al. | |
| 2003/0214190 | A1 | 11/2003 | Congdon et al. | |
| 2004/0245878 | A1 | 12/2004 | Kim et al. | |
| 2006/0038456 | A1 * | 2/2006 | Bojiuc | H02K 23/54 310/156.32 |
| 2006/0038460 | A1 * | 2/2006 | Bojiuc | H02K 23/54 310/156.32 |
| 2006/0066173 | A1 | 3/2006 | Kim et al. | |
| 2008/0054740 | A1 | 3/2008 | Kim et al. | |
| 2009/0072650 | A1 | 3/2009 | Yoshikawa et al. | |
| 2009/0079286 | A1 | 3/2009 | Kim et al. | |
| 2009/0230808 | A1 | 9/2009 | Tatebe | |
| 2012/0007453 | A1 | 1/2012 | Leiber et al. | |
| 2012/0133221 | A1 | 5/2012 | Leiber et al. | |
| 2013/0099618 | A1 * | 4/2013 | Kusase | H02K 1/276 310/156.56 |
| 2013/0119789 | A1 * | 5/2013 | Maekawa | H02K 21/12 310/46 |
| 2013/0270948 | A1 | 10/2013 | Unterfrauner | |
| 2015/0270754 | A1 * | 9/2015 | Kusase | H02K 15/125 310/59 |
| 2016/0072343 | A1 | 3/2016 | Köhler et al. | |
| 2018/0034353 | A1 | 2/2018 | Gieras et al. | |
| 2018/0166931 | A1 * | 6/2018 | Takahashi | H02K 3/12 |
| 2021/0167674 | A1 | 6/2021 | Tsuda et al. | |
| 2022/0263394 | A1 | 8/2022 | Takahashi | |
| 2024/0322619 | A1 * | 9/2024 | Rosen | H02K 1/165 |
| 2024/0339905 | A1 * | 10/2024 | Pal | F04D 13/0666 |
| 2025/0167614 | A1 * | 5/2025 | Suto | H02K 3/24 |
| 2025/0330073 | A1 * | 10/2025 | Rosen | H02K 3/12 |

FOREIGN PATENT DOCUMENTS

| | | | |
|---|---|---|---|
| DE | 1188709 | B | 3/1965 |
| DE | 1463855 | A1 | 1/1969 |
| DE | 1613077 | A | 6/1970 |
| DE | 4234129 | C2 | 3/1995 |
| DE | 44 11 751 | C2 | 7/1997 |
| DE | 19704652 | C1 | 7/1998 |
| DE | 10321702 | A1 | 1/2004 |
| DE | 60102398 | T2 | 2/2005 |
| DE | 102010055030 | A1 | 6/2012 |
| DE | 102013206593 | A1 | 10/2014 |
| DE | 102014108366 | A | 12/2015 |
| DE | 102015226105 | A1 | 6/2016 |
| DE | 102017102314 | A1 | 8/2018 |
| DE | 102019109229 | A1 | 10/2020 |
| EP | 1879283 | B1 | 9/2015 |
| EP | 3280035 | A1 | 2/2018 |
| EP | 3709486 | A1 | 9/2020 |
| JP | 2001136606 | A | 5/2001 |
| JP | 2018082600 | A | 5/2018 |
| JP | 2021078242 | A | 5/2021 |
| JP | 2021083170 | A | 5/2021 |
| KR | 100764018 | B1 | 10/2007 |
| WO | 2004004098 | A1 | 1/2004 |
| WO | 2010099975 | A2 | 9/2010 |
| WO | 2011021769 | A1 | 2/2011 |
| WO | 2019142663 | A1 | 7/2019 |

OTHER PUBLICATIONS

Translation of Notification pursuant to Rule 71(3) EPC for European Patent Application No. EP 22753621.6, dated Sep. 23, 2025. 134 pages.
Translation of Japanese Office Action for Korean Patent Application No. JP 2024-506151, dated Jul. 18, 2025, 11 pages.
International Search Report (including English translation) and Written Opinion for International Application No. PCT/EP2022/069784, dated Feb. 9, 2023.
Office Action, including Search Report, for German Patent Application No. 10 2021 003 942.4, dated May 27, 2022, 14 pages.
Translation of European search report for corresponding EP application No. 26159658.9, dated Jun. 9, 2026 , 30 pages.

* cited by examiner

STATOR FOR A RADIAL FLUX DOUBLE-ROTOR MACHINE, RADIAL FLUX DOUBLE-ROTOR MACHINE AND METHOD FOR PRODUCING A STATOR FOR A RADIAL FLUX DOUBLE-ROTOR MACHINE

CROSS REFERENCE TO RELATED APPLICATION (S)

This application is a Section 371 National Stage Application of International Application No. PCT/EP2022/069784, filed on Jul. 14, 2022, entitled "Stator for a radial flux double-rotor machine, radial flux double-rotor machine and method for producing a stator for a radial flux double-rotor machine", which published as WIPO Publication No. 2023/006440 A2, on Feb. 2, 2023, not in English, which claims priority to German Patent Application No. 10 2021 003 942.4, filed on Jul. 29, 2021, the contents of which are incorporated herein by reference in their entireties.

FIELD OF THE INVENTION

The present invention relates to a stator for a radial flux double-rotor machine, in particular for a wheel hub motor, a corresponding radial flux double-rotor machine, in particular for a wheel hub drive, and a method for producing a stator for a radial flux double-rotor machine.

TECHNICAL BACKGROUND

Electric machines having a stator and two rotors which are connected together for conjoint rotation, so-called double-rotor machines (in addition to double-rotor, also referred to as multi-rotor, dual-rotor etc.) can increase both the torque density and the efficiency of electric drives compared with conventional electric machines having only one rotor. This can be attributed to the fact that, particularly in the so-called "yokeless" design, no back iron is required in the stator and, as a result, the magnetic losses can be significantly reduced. In addition, with two rotors there is basically more space available for the field-exciting magnets (in the case of permanent magnet-excited synchronous machines, PSM) or the conductor material (in the case of induction machines, IM or electrically excited synchronous machines, ESM). According to the orientation of the magnetic field lines in the air gap, such machines can be divided into two groups, axial flux-carrying (field lines in parallel with the axis of rotation, so-called axial flux machines) on the one hand and radial flux-carrying (field lines in a radial direction in the air gap, so-called radial flux machines) on the other hand.

Axial flux double-rotor machines are described e.g. in DE 10 2015 226 105 A1 and DE 10 2013 206 593 A1. They are characterised by a high torque and power density, but are costly to manufacture because very complex geometries must be punched or manufactured using powder metallurgy in the stator core. To date, such machines have therefore not made the leap into large-scale production and are used only in niche areas with high power density requirements, such as racing, aviation, etc. In addition, the mechanical fastening concepts for the stator winding permit only the use of single-tooth windings which have corresponding disadvantages in relation to noise excitations.

In contrast, in the case of radial flux double-rotor machines, manufacturing methods can be used which are established in principle for the winding and laminated core and are suitable for large-scale production. However, in this case there is a significant and largely unresolved technical challenge in terms of supporting the torque produced in the stator core. By reason of the internally and externally rotating parts, the laminated stator core cannot be mounted (e.g. pressed-in, screwed or adhered) in a fixed housing, as is otherwise usually the case. Therefore, the torque is guided to the axial ends of the laminated stator core or stator winding and is supported at this location. In the prior art, various approaches have been proposed in this regard but all are associated with considerable disadvantages in relation to function and/or costs.

EP 1 879 283 B1 describes one way of designing the stator winding as a so-called yoke winding. The annular laminated stator core has in this case grooves on the inner and outer diameter, between which there is located a back iron (also referred to as a stator yoke) which is effective in a tangential direction. In this case, forward and return conductors of each winding strand are guided in grooves lying radially one above the other in each case and are wound around the yoke. The stator yoke is axially accessible between the winding strands and can be fixed on the housing e.g. by means of axial screw-connections (described e.g. in JP 2018 082 600). The axial compression of the screws ensures both the torsion stiffness of the laminated core and torque support at the axial end. The north pole and south pole of the rotor field are located opposite one another. A disadvantage of this concept is that the magnetic flux must be carried completely via the return yoke located between the stator grooves. On the one hand, this leads to an increased weight of the laminated stator core and increases the iron losses significantly. The magnetic field lines of both rotor fluxes are closed via the back iron in the laminated stator core and give rise to iron losses at this location. In addition, all individual coils of the yoke winding must be interconnected in parallel or in series in the region of the winding head, which in turn leads to a conflict over installation space with torque support. However, the winding wound around the yoke allows direct mechanical contacting of the laminated stator core.

A considerable weight and loss saving can be achieved if the magnetisation directions of the magnets lying radially one above the other point in the same direction and the current supply directions of the conductors lying one above the other in the grooves are identical. In this case, the back iron in the stator can be omitted and a so-called "yokeless" double rotor machine having a distributed winding is produced. The magnetic field lines are closed over the rotor. A back iron in the stator is not required, as a result of which weight and iron losses in such machines are very low. However, the distributed winding does not permit direct mechanical contacting of the laminated stator core for torque support. For example, WO 2004/004098 A1 describes a yokeless embodiment having a distributed winding.

Also in the case of a so-called "yokeless" design, it can be expedient nevertheless to produce a thin yoke for mechanical connection of the stator teeth, but this is not necessary in terms of electromagnetism. The term "yokeless" thus refers to the electromagnetic flux carrying, in which no flux in a tangential direction is present in the stator. However, in this case the winding cannot be designed as a yoke winding because forward and return conductors of the winding strands are distributed radially on the periphery and thus form a distributed winding. This produces winding heads of distributed windings which impede accessibility of the laminated core in an axial direction. Moreover, the purely radial flux carrying precludes the use of axial, metallic screw connections because they form conductor loops with a lot of linked flux and high additional current heat losses.

With respect to the axial support, various auxiliary constructions for torque support are proposed in the prior art, e.g. as described in DE 10 2010 055 030 A1 or U.S. Pat. No. 7,557,486 B2. The problem here is that electrically and/or magnetically conductive metals are not allowed to protrude into the flux-carrying region, or are allowed to do so only to a very limited extent, which severely restricts the material selection and geometric design. In contrast, synthetic material components, adhesives and/or casting materials can also be used in the flux-carrying region. However, with such materials it is very difficult to meet the stringent requirements with regard to temperature stability and mechanical strength.

In summary, it should be noted that for torque support for yokeless radial flux double-rotor machines, a satisfactory solution cannot be found in the prior art. This is a situation which needs to be remedied.

SUMMARY OF THE INVENTION

Against this background, one of the ideas of the present invention is to provide an improved stator for a radial flux double-rotor machine, an improved radial flux double-rotor machine and an improved method for producing a stator for a radial flux double-rotor machine.

Accordingly, the following aspects are disclosed:

- a stator for a radial flux double-rotor machine, in particular for a wheel hub motor, comprising: a stator core; a winding which is placed in the stator core and is designed to be self-supporting for torque support of the stator, wherein the winding protrudes beyond the stator core at at least one axial end; and a support device which is arranged axially offset with respect to the stator core and is designed for form-fitting engagement with the winding at the at least one axial end for torque support.
- a radial flux double-rotor machine, in particular for a wheel hub drive, comprising: a mechanically fixed base; a stator in accordance with the invention, wherein, for torque support, the support device is in form-fitting engagement with the at least one axial end of the winding and is supported on the base; a first rotor arranged radially inside the stator core; and a second rotor arranged radially outside the stator core.
- a method for producing a stator for a radial flux double-rotor machine, in particular a stator in accordance with the invention, comprising the steps of: providing a stator core having radially outer stator grooves describing in each case a helical line, and radially inner stator grooves describing in each case a helical line with an opposite turning direction; introducing individual conductor bars following the helical lines through the inner and outer stator grooves; and connecting the conductor bars, which are introduced into the inner and outer stator grooves, at the conductor bar ends to form conductor loops.

The finding forming the basis of the present invention is that a winding of a radial flux double-rotor machine can be designed to be power-transmitting for torque support. The idea forming the basis of the present invention is now to design the winding arranged in the stator core to be self-supporting for torque support and to bring said winding into engagement in a form-fitting manner with a support device, which is arranged axially offset with respect to the stator core, for torque support.

A self-supporting design of the winding is to be understood to mean that sufficient stiffness and strength of the winding for supporting the drive torque with respect to torsion about the machine axis are provided. The self-supporting winding is embedded in particular into a soft-magnetic stator core for magnetic flux carrying. This offers the particular advantage that the stator core itself does not require any inherent torsion stiffness in relation to the machine axis and also no other auxiliary construction for fixing the stator core is required. On the contrary, the torque is supported, in particular completely, by means of the winding.

Therefore, a functional integration which is hitherto unknown or technically unfeasible in the field of radial flux double-rotor machines is provided, in that the winding is given a supporting function to support the torque in addition to current conduction, and the winding is mechanically fixed to an axial end outside the stator core.

In order to produce such a winding, integral manufacture of the winding in the existing stator core is proposed. For this purpose, the individual bars of the winding are inserted in an axial direction following the helical line of the stator grooves through the radially inner and radially outer stator grooves and are connected at the conductor ends. Optionally, an integrally bonded connection by welding or soldering is provided in this case. Therefore, the winding is form-fittingly connected to the stator core.

The selected lead angle (also setting angle) of the stator grooves or the helical lines described therewith ensures that, by connecting the conductor bars introduced, conductor loops are formed. The angle of the conductor loops in the machine, which are swept in relation to the centre axis, encloses in each case a magnetic pole of the rotors. In this manner, despite the functional integration, very simple production of the stator is made possible, which manages with very few components and comparatively simple conventional connection technology and thus also with very few manufacturing steps.

The stator designed in this manner can now be completed with various inner and outer rotors known to a person skilled in the art to form an electric machine in accordance with the invention. This includes e.g. permanent magnet-excited rotors having surface magnets and/or buried magnets, short-circuit rotors or electrically excited rotors. Hybrid variants with different rotor variants in the inner and outer rotor can also be provided. A particularly advantageous embodiment is provided if the rotors consist of soft magnetic solid material and are produced having surface-mounted permanent magnets. The small upper field spectrum of the winding variants described in this case and the distance between the solid material and the air gap ensured by the magnets prevent the occurrence of unacceptably large losses by reason of eddy currents in the rotors. In this embodiment, comparatively high degrees of efficiency can then be achieved in an advantageous manner and the rotors can still be manufactured cost-effectively.

The support device is fixedly connected, by means of a suitable method, to the base as the stationary part of the electric machine. One possible embodiment provides for this purpose cut-outs, e.g. through-bores, for force-fitting fastening means, such as e.g. screws. However, in addition or alternatively it would of course also be feasible to use form-fitting connecting means and/or an integrally bonded connection.

In particular, the present invention can be used in a particularly advantageous manner for a wheel hub motor, optionally for a motor vehicle. The construction in accordance with the invention ensures that, by reason of the functional integration, the mass of a radial flux double-rotor machine can be reduced and the torque density can be increased, which advantageously means a reduction in unsprung masses, particularly in the case of wheel hub motors. Furthermore, in accordance with the invention a comparatively short axial length can be achieved with a comparatively large diameter, which is particularly advantageous in the wheel interior in relation to torque support and installation space.

On the other hand, in accordance with the invention, in spite of the extremely compact design very high torques are also possible, in particular they are high enough in order to drive a wheel of a vehicle directly without a transmission. Thus, in a particularly advantageous manner transmission losses are avoided, further weight is saved and particularly high advantages in terms of the degree of efficiency can be achieved.

Furthermore, this high torque which, for installation sizes within the dimensions of standard motor vehicle rims, is already possible in the four-digit range, in particular greater than 5000 Nm, and thus already extends into the range of the limit of liability of standard road tyres, even allows a rear axle wheel brake to be replaced by the wheel hub motor. Therefore, in the application as a wheel hub motor particular synergies are made possible.

Also disclosed according to one aspect is thus a vehicle axle, in particular for a motor vehicle, having a radial flux double-rotor machine in accordance with the invention which is coupled without a transmission to a drive wheel.

Also disclosed according to one aspect is a motor vehicle having such a vehicle axle.

Advantageous embodiments and developments are apparent from the further dependent claims and from the description with reference to the figures of the drawing.

According to one embodiment, the winding is designed to be torsionally stiff such that a torque acting upon the stator core during the operation of a radial flux double-rotor machine can be supported, in particular completely, via the torsionally stiff winding on the support element. In this manner, all other types of force support devices, in particular for the stator core, can be advantageously omitted.

According to one embodiment, the stator core is designed for carrying a primarily radial magnetic flux. This is therefore a so-called "yokeless" design of the stator core which avoids, in particular, magnetic flux carrying in a peripheral or tangential direction. A back iron in the stator core is not required, whereby weight and iron losses are reduced.

According to one embodiment, the stator core has a radial yoke thickness which is less than 30%, optionally less than 20%, particularly optionally less than 10% of an overall radial stator core thickness. In the case of a so-called "yokeless" design, a mechanical connection of the stator teeth is nevertheless provided in this manner, which, however, is not electromagnetically necessary and via which no functionally relevant magnetic flux takes place either. The term "yokeless" thus relates in particular to the electromagnetic flux carrying of the stator core.

According to one embodiment, the winding is formed from conductor bars which are connected together, in particular in the manner of a bar structure. In particular, the conductor bars can be connected in an integrally bonded manner, e.g. by welding or soldering. However, other connection techniques would also be feasible. Optionally, two conductor bars are each connected at the conductor bar ends and all conductor bars together form such a bar structure. The bar structure formed with the conductor bars is advantageously configured in a torsionally stiff manner per se and is designed for transmitting torque about the centre axis of the stator. Furthermore, the conductor bars are designed having a thickness sufficient for the transmission of power. In the case of a wheel hub motor, the thickness of the conductor bars can be e.g. in the range of several millimetres. In particular, they can be bars having a square profile with edge lengths of several millimetres.

According to one embodiment, the winding has a radially inner layer of helically arranged conductor bars and a radially outer layer of oppositely helically arranged conductor bars. In this manner, a bar structure is formed by the winding and has a high torsion stiffness. The conductor bars of the inner layer and the conductor bars of the outer layer each describe a helical line, of which the turning directions or pitches are opposed to one another. An angle—swept in relation to the centre axis of the stator—of the helical line between the beginning and the end of a conductor bar is designed in particular in such a manner that one conductor loop is formed per pole of the rotors in a radial flux double-rotor machine. The swept angle to be provided can thus be calculated from the quotient of a whole revolution ($2\pi$ or 360°) and twice the number of pole pairs p.

According to one embodiment, the radially inner layer and the radially outer layer of the winding have in each case the thickness of an individual conductor bar. That is to say that a phase of the winding is formed in each case having the cross-section of an individual conductor bar. Such a winding design in accordance with the invention is made possible, inter alia, by the specific design of the radial flux double-rotor machine which prevents the current displacement to the surface, which is otherwise present in conductors, by means of the magnetic symmetry thereof. This permits comparatively thick conductor cross-sections and a relatively uniform current distribution is still achieved over the cross-section. For example, the thickness of the conductor bars can be in the range of several millimetres. In particular, they can be bars having a square profile with edge lengths of several millimetres, e.g. in the range of 2 mm to 6 mm, in particular in the range of 3 mm to 5 mm. Other cross-sectional shapes are likewise possible.

According to one embodiment, the conductor bars are each twisted corresponding to the helical course such that a cross-section of a conductor bar is the same at each point of the conductor in relation to a radial axis of the cross-section. This relates, in particular, to a torsion of a conductor bar, in particular a non-round conductor bar, about the centre axis of the stator or the machine. Depending upon the course of the helical shape, the conductor bars can additionally also be bent. The inner and outer layers are arranged in an interlaced manner, i.e. rotated, twisted and possibly bent in opposite directions, with respect to one another. In this manner, from a mechanical viewpoint the orientation of a conductor bar is oriented ideally for power transmission with the stator core at each point of the stator core, so that the respective conductor bar is loaded uniformly over its length. Therefore, in the resulting bar structure the conductors advantageously absorb predominantly tensile and compressive stresses when subjected to tangential force. In this manner, load peaks and deformations of the conductor bars are avoided. In particular when compared to a design with axis-parallel, straight conductors, the mechanical stresses can thus be significantly reduced.

According to one embodiment, the conductor bars of the radially inner and outer layer associated with the same phase of the winding are connected together in each case at the conductor bar ends, in particular via a radially arranged conductor bar piece and/or by means of an integrally bonded connection. In addition to a conductor loop, this also creates a torsionally stiff bar structure-like construction so that, when an axially accessible winding end is fixed, a high torque can be absorbed by the winding without causing unacceptably large deformations and/or stress states. Therefore, the self-supporting design of the winding is made possible only by the winding material, e.g. copper, without additional support means or elements.

According to one embodiment, the stator core contains a laminated stator core with helically extending stator grooves corresponding to the course of the winding, wherein an individual conductor bar is arranged in each stator groove of the laminated stator core. The winding or the self-supporting bar structure formed therewith is thus embedded in the laminated stator core. In a similar manner to the conductor bars of the winding, the stator grooves thus change their tangential position in dependence upon the axial position, producing the helical shape. The direction of the change in position follows the conductor bars, i.e. the centre line of the radially outer grooves and the radially inner grooves likewise describe a helical line, of which the turning directions are opposed.

In the case of further embodiments, other types of production known to a person skilled in the art for producing the stator core geometry in accordance with the invention having the radially inner and outer stator grooves extending helically in opposite directions would also be feasible, in particular also additive types of production, such as sintering methods or the like.

According to one embodiment, only one single conductor bar is placed in each stator groove of the laminated stator core. As already explained in relation to the winding, the conductor bars of the inner and outer stator grooves are helically interlaced against one another by torsion about the centre axis of the machine, so that the conductor ends of the inner and outer layers are guided towards one another. The conductor bars are conductively connected together at the conductor bar ends, in particular via a radially arranged conductor bar piece and/or by means of an integrally bonded connection, e.g. by welding or hard soldering.

According to one embodiment, the conductively connected conductor bars of the inner and outer layer together form wave-shaped winding strands. The winding strands can be interconnected to form a rotational field-generating winding with a desired or adjustable number of strands by means of corresponding interconnections which are known to a person skilled in the art. The voltage-retaining number of strand turns is determined directly from the quotient of the number of grooves in the numerator and a product of the number of strands and the number of parallel branches in the numerator. In an advantageous manner, the number of parallel branches is selected to be 1. In this case, the simplest possible interconnection of the winding is produced.

According to one embodiment, the stator sheets of the laminated stator core are formed in each case identically having recesses provided for forming the stator grooves. The helical course of the stator grooves is provided by stacking the stator sheets in a manner rotated with respect to one another. In this manner, the laminated stator core can be manufactured in a very economical way because the same punching die can be used for all stator sheets which are arranged in parallel or are stacked. Accordingly, two adjacent stator sheets are rotated slightly with respect to one another by a predetermined angle about the centre axis so that the recesses are arranged in an overlap with respect to one another, which corresponds to the helical line course.

According to one advantageous embodiment, the laminated stator core contains an inner partial package having radially inner stator grooves and an outer partial package having radially outer stator grooves. The stator sheets of the inner partial package are each produced having an identical geometry and the stator sheets of the outer partial package are each produced having an identical geometry. The stator sheets of the inner partial package and the stator sheets of the outer partial package are stacked in a manner rotated in opposite directions with respect to one another. In this manner, the opposite helical lines of the stator grooves can be produced with little manufacturing outlay. Nevertheless, a very economical manufacturing method is still permitted because the same punching die can be used for all parallel or stacked stator sheets of the inner partial package and the same punching die can be used for all parallel or stacked stator sheets of the outer partial package. Accordingly, two adjacent stator sheets of the inner partial package are rotated slightly with respect to one another in a first direction by a predetermined angle about the centre axis and two adjacent stator sheets of the outer partial package are rotated slightly with respect to one another in a second opposite direction by a predetermined angle about the centre axis. In this manner, the recesses of the stator sheets of the inner partial package and the recesses of the stator sheets of the outer partial package are arranged in an opposed overlap with respect to one another, which corresponds to the opposed helical line course.

According to a further embodiment, the stator sheets are formed in each case differently having recesses provided for forming the stator grooves. The helical course of the stator grooves is provided by means of different distances of the recesses in the individual stator sheets. In this respect, an individually matching stator sheet shape is produced in this case for each position of a stator sheet within the stack, wherein the individual geometries can also be repeated within the stack. In this case, the production can be implemented e.g. by means of a beam cutting process, in particular a laser beam cutting process, which is more flexible in terms of shape compared to a punching process. Also feasible would be flexible punching dies having a variable geometry or, in the case of very large quantities, of course a plurality of individual punching dies for each of the different stator sheet shapes.

According to one development, the recesses for radially inner and radially outer stator grooves are each integrally formed in a common stator sheet, wherein the oppositely helical course of the radially inner and radially outer stator grooves is provided by a continuous displacement of the inner and outer stator grooves with respect to one another from stator sheet to stator sheet. In this case, an individually matching stator sheet shape is also produced for each position of a stator sheet within the stack, wherein the individual geometries can also be repeated within the stack. In particular flexible separating processes, such as e.g. laser beam cutting, are also used in this case for production purposes. The one-piece production of the inner and outer recesses which is thus possible advantageously reduces the number of parts.

According to one embodiment, the stator sheets have straight, in particular punched, edges. A width of the recesses provided for the stator grooves is larger than the width of the conductor bars by an amount which is predetermined by the pitch of the helical shape of the course of the stator grooves and by the sheet thickness of the stator sheets. A clear width or continuous width of the stator grooves which is reduced by reason of the offset between the recesses of the stator sheets thus corresponds substantially to the width of a conductor bar. In practice, the continuous clear width of the stator groove is provided slightly larger than the width of the conductor bar in order to provide a clearance fit necessary for introducing the conductor bars. The edge of a stator groove thus describes a staircase shape with the respective sheet thickness as steps, on which the conductor bar is uniformly supported. In this manner, torque support is made possible uniformly over the entire thickness of the laminated stator core or over the entire length of the conductor bars accommodated in the laminated stator core.

According to one embodiment, an angle swept in each case by the stator grooves is smaller than an angle swept in each case by the conductor bars. The swept angle relates in each case to a rotation about the centre axis of the stator. The difference in the swept angles arises by reason of the fact that the conductor bars protrude axially beyond the stator core and are thus longer than the stator grooves. Since the helical course likewise continues, a larger angle swept thereby is produced. The stated difference is provided so as to ensure sufficient accessibility of the winding ends for connecting, in particular welding, the conductor bar ends after introduction into the stator grooves. Furthermore, this enables the winding to engage with the support device or the support element thereof in a manner axially offset with respect to the stator core.

From the quotient of the swept angles, i.e. a ratio of the angle swept by each of the stator grooves to the angle swept by each of the conductor bars, a so-called pole coverage degree can be defined for the laminated stator core.

According to one embodiment, a ratio of the angle swept by each of the stator grooves to the angle swept by each of the conductor bars is in a range between 0.6 and 0.8, in particular between 0.6 and 0.75, optionally between 0.6 and 0.7. This ratio (pole coverage degree) provides in this range an optimum between losses, produced by current heat, and torque utilisation.

According to one embodiment, the support device has a support element, in which support grooves are provided which correspond to the helical arrangement of the conductor bars and are in engagement with the conductor bars. In this manner, form-fitting embedding of the conductor bars into the support element is provided for the support of the torque at the axial end. Optionally, there is engagement with all conductor bars so that torque support is homogeneously or uniformly transferred over the entire bar structure of the winding.

In order to transmit the torque, the support element can be coupled to a mechanically fixed base of a radial flux double-rotor machine. For this purpose, one possible embodiment provides through-bores for force-fitting fastening means, such as screws, but of course form-fitting connection means or an integrally bonded connection would also be feasible.

According to one embodiment, the support grooves follow, at least in sections, the helical course of the twisted conductor bars. In particular, the support grooves have a similarly twisted course like the conductor bars. For example, the support element is substantially annular and has recesses on the inner and/or outer periphery which are oriented radially and correspond to the course of the conductor bars.

According to one embodiment, the support device has a radially inner support element for engagement with the radially inner layer of the conductor bars, and has a radially outer support element for engagement with the radially outer layer of the conductor bars. In this embodiment, the support elements can be annular, wherein the inner support element has, on its outer periphery, grooves or teeth corresponding to the course of the inner layer of the conductor bars for receiving the radially inner conductor bars in a form-fitting manner, and the outer support element has, on its inner periphery, grooves or teeth corresponding to the course of the outer layer of the conductor bars for receiving the radially outer conductor bars in a form-fitting manner. The grooves or teeth follow in particular the respective helical course. By reason of the arrangement on the inner or outer periphery, the recessed grooves are easily accessible for mechanical processing, which simplifies the production of the support elements.

According to one embodiment of a radial flux double-rotor machine, the support elements are fixed to the base and thus guide the torque to the fixed part of the electric machine. For this purpose, the support elements can be fastened individually with the base, e.g. a housing, of the machine. Alternatively or in addition, the inner and outer support elements can be fastened together.

According to one embodiment of a stator, the support device contains a heat-conducting material, in particular a metal, optionally an aluminium alloy. In particular, both support elements can contain such a material. This permits not only a high mechanical strength but also heat dissipation from the winding via the support device.

According to one embodiment of a corresponding radial flux double-rotor machine having a support device which contains a heat-conducting material, the base additionally has a heat sink which is designed to absorb heat dissipated via the support device from the stator, in particular from the winding. As a result, the support device has a high mechanical strength and at the same time ensures a good thermal connection of the winding to the heat sink. For example, the housing of the machine can serve as the heat sink. Alternatively or in addition, the support device, optionally the inner and outer support elements, can be in thermal contact with an actively cooled heat sink of the machine. In this manner, the current heat losses produced in the winding or in the conductor bars can be effectively dissipated.

According to one embodiment of a radial flux double-rotor machine, a predetermined number of pole pairs are provided both on the first rotor and on the second rotor. An angle swept by each of the conductor bars is designed to form a conductor loop for each pole of the rotors. The swept angle to be provided can thus be calculated from the quotient of a whole revolution (2π or 360°) and twice the number of pole pairs p.

According to one embodiment of the production method, providing the stator core comprises producing a laminated stator core, wherein individual stator sheets which have recesses for forming stator grooves are stacked in a twisted manner with respect to one another. In this manner, the laminated stator core can be manufactured in a very economical way because the same punching die can be used for all stator sheets which are arranged in parallel or are stacked. Accordingly, two adjacent stator sheets are rotated slightly with respect to one another by a predetermined angle about the centre axis so that the recesses are arranged in an overlap with respect to one another, which corresponds to the helical line course. The individual stator sheets are produced with such a geometry in an advantageous manner by punching or laser beam cutting of individual laminations of electrical steel.

According to one development of the method, the laminated stator core contains an inner partial package and an outer partial package, wherein all stator sheets of the inner partial package are designed having an identical geometry in each case and all stator sheets of the outer partial package are designed having an identical geometry in each case, and wherein the stator sheets of the inner partial package for forming the inner stator grooves and the stator sheets of the outer partial package for forming the outer stator grooves are stacked in a manner twisted oppositely with respect to one another. In this case, all sheets of the respectively inner and outer package can be designed having the same geometry, thus making the production process very economical. Therefore, the same punching die can be used for all stator sheets of the inner partial package which are arranged in parallel or are stacked, and the same punching die can be used for all stator sheets of the outer partial package which are arranged in parallel or are stacked. Two adjacent stator sheets of the inner partial package are rotated slightly with respect to one another in a first direction by a predetermined angle about the centre axis and two adjacent stator sheets of the outer partial package are rotated slightly with respect to one another in a second direction by a predetermined angle about the centre axis. In this manner, the recesses of the stator sheets of the inner partial package and the recesses of the stator sheets of the outer partial package are arranged in an opposed overlap with respect to one another, which corresponds to the opposed helical line course. In this manner, the opposite helical lines of the stator grooves can be produced with little manufacturing outlay.

According to a further embodiment of the method, the laminated stator core has a large number of differently formed stator sheets, wherein the recesses for the inner and outer stator grooves are integrated in each case in a common stator sheet, and wherein the pitch of the helical line is achieved by means of a continuous displacement of the inner and outer stator grooves with respect to one another from stator sheet to stator sheet, in particular with a flexible punching or laser beam separation process. The inner and outer stator grooves are integrated into a single stator sheet (lamination) and the helical course of the stator grooves is achieved in each individual sheet by means of a continuous displacement of the recesses with respect to one another in the separation process, e.g. by means of a flexible punching process or a laser beam separation process. This has the advantage that fewer parts also means that fewer manufacturing steps are required and the stator sheet thus produced or the entire stator core has greater mechanical strength.

In a further embodiment, the method further comprises the step of providing a support device which is designed for form-fitting engagement with the conductor bar ends at at least one axial end for torque support, and the step of bringing the support device into form-fitting engagement with the conductor bar ends at the at least one axial end at a position arranged axially offset with respect to the stator core.

Furthermore, according to one aspect the stator produced in this manner can be used for performing a method for producing a radial flux double-rotor machine, comprising the further steps of: providing a mechanically fixable base and a support device which is designed for form-fitting engagement with the winding at the at least one axial end for torque support, and fastening the support device to the base.

The above embodiments and developments can be combined with each other in any manner if it is useful to do so. In particular, all of the features of the stator can be transferred to the method for producing the stator, and vice versa. Furthermore, all of the features of the stator can be transferred to a corresponding radial flux double-rotor machine and to a vehicle axle having such a radial flux double-rotor machine and/or a vehicle having such a vehicle axle.

Further possible embodiments, developments and implementations of the invention also comprise non-explicitly-mentioned combinations of features of the invention which have been described or will be described hereinafter with reference to the exemplified embodiments. In particular, in this regard a person skilled in the art will also add individual aspects as improvements or complements to the respective basic form of the present invention.

CONTENT OF THE DRAWING

The present invention will be explained in more detail hereinafter with the aid of the exemplified embodiments shown in the schematic figures of the drawing. In the drawing.

Figure 1:
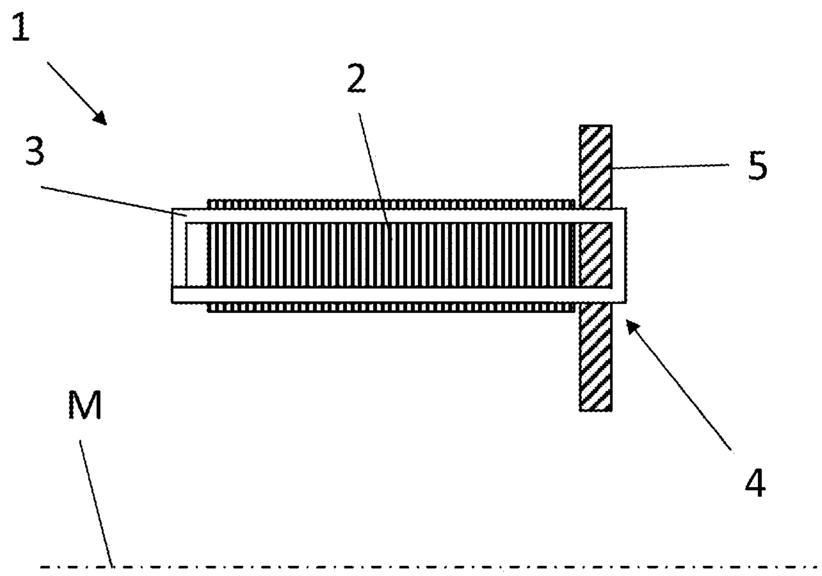
FIG. 1 shows a schematic longitudinal sectional view of a stator.

The attached figures of the drawing are intended to provide improved understanding of the embodiments of the invention. They illustrate embodiments and are used in conjunction with the description to explain principles and concepts of the invention. Other embodiments and many of said advantages will be apparent in view of the drawings. The elements in the drawings are not necessarily illustrated to scale with respect to each other.

In the figures of the drawing, like and functionally identical elements, features and components and elements, features and components acting in an identical manner are provided with the same reference signs, unless indicated otherwise.

DESCRIPTION OF EXEMPLIFIED EMBODIMENTS

FIG. 1 shows a schematic longitudinal sectional view of a stator 1.

This is a schematic diagram of a stator 1 for a radial flux double-rotor machine 10 (see in this respect FIG. 2), in particular for a wheel hub motor. The stator has a stator core 2, a winding 3 and a support device 5. The stator core 2, the winding 3 and the support device 5 are designed to be rotationally symmetrical about the indicated centre axis M.

The winding 3 is self-supporting for torque support of the stator 1 and protrudes beyond the stator core 2 at at least one axial end 4. The support device 5 is arranged axially offset with respect to the stator core 2 and is form-fittingly connected to the winding 3 at at least one axial end 4 for torque support. In this manner, a torque present at the stator core 2 during the operation of a radial flux double-rotor machine 10 can be supported by means of the self-supporting winding 3 on the support device 4.

The winding contains a conductor material having a low electrical resistance, optionally copper. The stator core 2 is constructed optionally from a soft-magnetic material for magnetic flux carrying. The support device contains optionally a heat-conducting material, e.g. an aluminium alloy. Of course, the winding 3 is electrically isolated.

Figure 2:
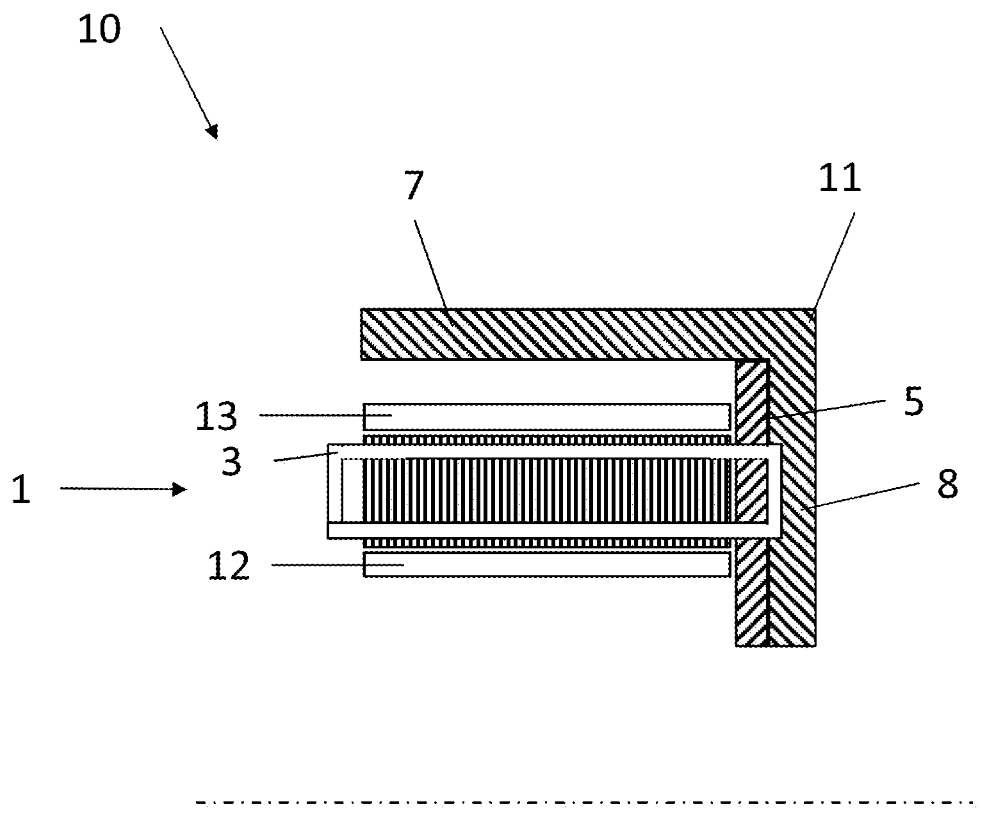
FIG. 2 shows a schematic longitudinal sectional view of a radial flux double-rotor machine.

FIG. 2 shows a schematic longitudinal sectional view of a radial flux double-rotor machine 10.

This is also a purely illustrative schematic diagram. Accordingly, the radial flux double-rotor machine 10 has, in addition to the stator 1 shown in FIG. 1, a mechanically fixed base 11, a first rotor 12 and a second rotor 13. The stator core 2, the winding 3, the support device 5, the base 11, the first rotor 12 and the second rotor 13 are likewise designed to be rotationally symmetrical about the indicated centre axis M.

The winding 3 is self-supporting for torque support of the stator 1 and protrudes beyond the stator core 2 at at least one axial end 4 and is supported on the base 11 via the support device 5. The support device 5 is arranged axially offset with respect to the stator core 2 and is form-fittingly connected to the winding 3 at at least one axial end 4 for torque support. Again, the support device 5 is fastened to the base so that the torque can be supported via the support device 5 on the base 11.

The first rotor 12 is arranged radially within the stator core 2 and the second rotor 13 is arranged radially outside the stator core 2. The base 11 can be designed e.g. as a housing of the machine and in this case comprises in a purely illustrative manner an L-shaped structure which is illustrated having two limbs 7, 8. The illustration is not to be understood as exhaustive, on the contrary the base can have further components and/or structural portions. The first limb 7 extends substantially radially, the second limb 7 extends substantially axially with the greatest distance with respect to the centre axis M.

Purely schematically, the support device 5 is illustrated in one part extending in a radial manner, but it can also be provided in multiple parts and/or with another geometry configured for form-fitting connection to the winding 3. The illustrated overlap of the winding 3 with the base 11 is purely due to the illustrative schematic illustration and does not signify a direct connection. The winding 3 is optionally connected via the support element 5 to the base 11 for torque support.

Figure 3:
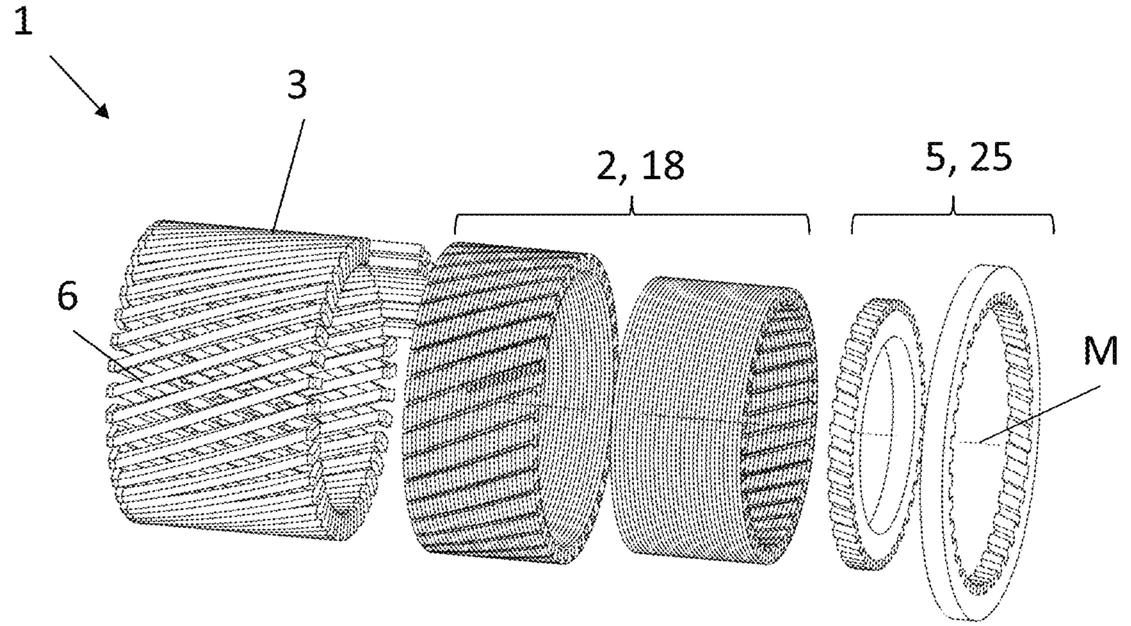
FIG. 3 shows an exploded view of a stator according to one embodiment.

FIG. 3 shows an exploded view of a stator 1 according to one embodiment.

The stator 1 has a winding 3, a stator core 2 and a support device 5, wherein, in this case, an advantageous exemplary design of these components is illustrated more precisely in perspective.

The winding 3 is constructed from an inner and outer layer having a plurality of conductor bars 6 which are connected together in the manner of a bar structure. The conductor bars 6 in the inner and outer layers are arranged opposite one another in a helical manner and are coupled in an integrally bonded manner at the conductor bar ends to a radial conductor piece 17 connecting the inner and outer layer.

The thickness of the inner and outer layer corresponds in each case to the thickness of a conductor bar 6. That is to say that the winding 3 is formed in the manner of a respective conductor bar 6 by means of a single conductor layer which forms the conductor loop and has a comparatively large cross-section.

By reason of the bar structure formed with the conductor bars, the winding is torsionally stiff and is thereby self-supporting for torque support.

Accordingly, the conductor bars 6 form wave-shaped winding strands and can be interconnected by means of corresponding interconnections, which are known to a person skilled in the art and therefore are not described further, such as e.g. a delta connection, star connection or the like, to form a rotational field-generating winding having any number of strands.

In the illustrated embodiment, the stator core 2 and the support device 5 are each constructed by way of example from two components. For the assembly of the stator 1, the winding 3, the stator core 2 and the support device 5 are arranged nested one inside the other. After assembly, the components are coaxially oriented with one another on the common centre axis M. The support device 5 which, here by way of example, is in two parts is arranged axially offset with respect to the other components and forms the innermost and outermost component of the stator 1. This is an inner ring and an outer ring which are each designed having grooves for form-fitting engagement with the conductor bars.

The stator core 2 which, here by way of example, is in two parts is formed with two laminated stator cores 18, which are rotated with respect to one another in a helical manner, and this will be discussed further in detail with reference to FIG. 8.

In further embodiments, the stator core 2 and the support device 5 can each also be formed in one part or with more than two parts.

Figure 4:
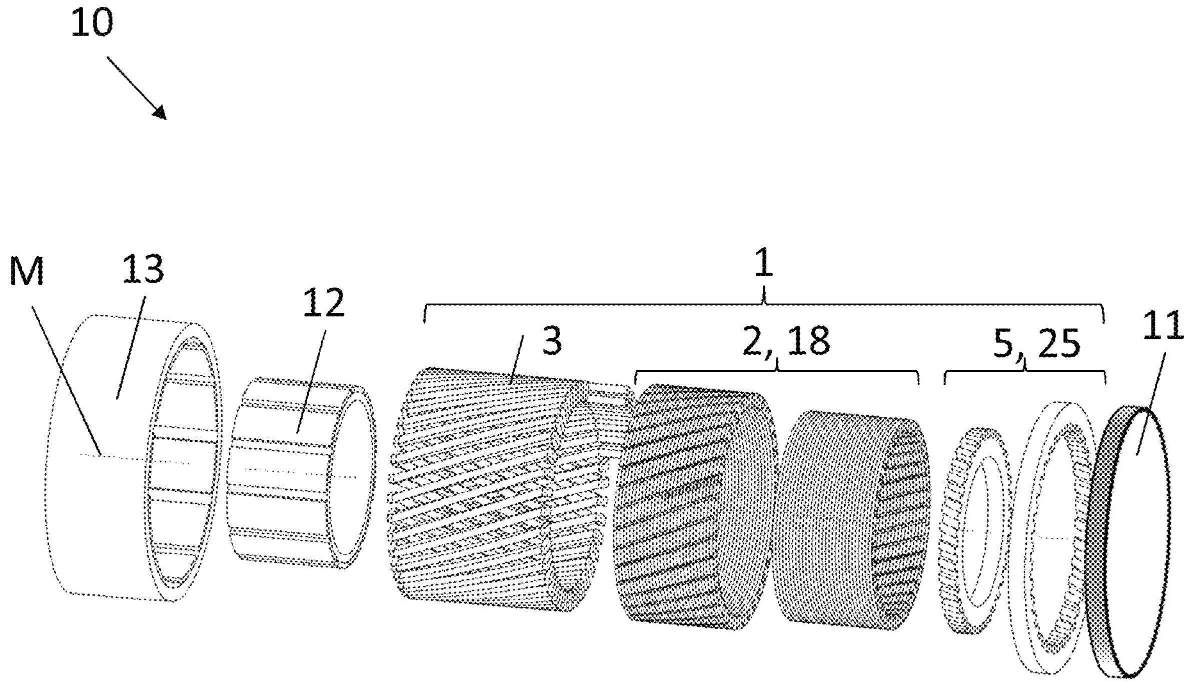
FIG. 4 shows an exploded view of a radial flux double-rotor machine according to one embodiment.

FIG. 4 shows an exploded view of a radial flux double-rotor machine 10 according to one embodiment.

The radial flux double-rotor machine 10 has, in addition to the components of the stator 1, a first rotor 12, second rotor 13 and a base 11. The first rotor 12 is arranged radially within the stator core 2 and the second rotor 12 is arranged radially outside the stator core 2. The rotors 12, 13 are manufactured optionally from a soft-magnetic solid material and are fitted, on the respective surface facing the stator core, with permanent magnets, so-called surface magnets, as poles. In further embodiments, it is possible to use other rotors which are known to a person skilled in the art, e.g. with buried magnets, short-circuit rotors or electrically excited rotors.

In this case, the base 11 is illustrated merely schematically for improved clarity. As already described in the description of FIG. 2, the base 11 is fastened in the mounted state to the support device 5. The base 11 is mechanically fixed with respect to a reference system, e.g. a support of a vehicle axle.

Figure 5:
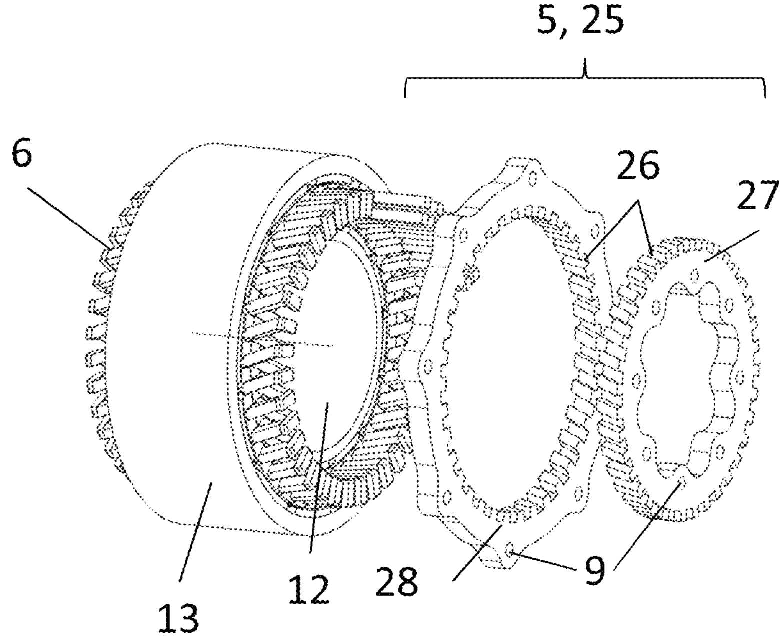
FIG. 5 shows an exploded view of a radial flux double-rotor machine according to a further embodiment.

FIG. 5 shows an exploded view of a radial flux double-rotor machine 10 according to a further embodiment.

In this case, the radial flux double-rotor machine 10 has substantially identical components, as stated in relation to FIGS. 3 and 4. The stator core 2, the winding 3, the first rotor 12 and the second rotor 13 are illustrated in the assembled state on the left-hand side of the figure.

The support device 5 illustrated on the right is likewise formed in two parts and differs in terms of the configuration of the respectively annular inner support element 27 and outer support element 28. The support elements 27, 28 are equipped in this case with support grooves 26. They are provided on the inner periphery of the outer support element 28 and are provided on the outer periphery of the inner support element 27 for engagement with the conductor bars 6 of the winding 3.

To this end, the support grooves 26 are designed to be axially angled corresponding to the helical course of the conductor bars or the pitch thereof, so that they can be brought into engagement with the conductor bars 6 of the winding 3.

The support elements 27, 28 are produced optionally from a conductive metal, in a particularly optional manner from an aluminium alloy. The two-part design of the support elements 27, 28 renders it possible for the support grooves 26 to be easily accessible for mechanical or machining processing during production.

The inner support element 27 and the outer support element 28 are each provided circumferentially with a plurality of bores 9 for fastening to the base 11. In this case, the bores 9 are arranged by way of example along a hole circle distributed uniformly on the periphery. The individual bores 9 are located slightly outside the main body of the support elements and the support elements 27, 28 thus form a star shape on the periphery facing away from the winding in each case. Of course, other distributions of the bores 9 are feasible, as are other types of fastening means for the connection to the base 11.

Figure 6:
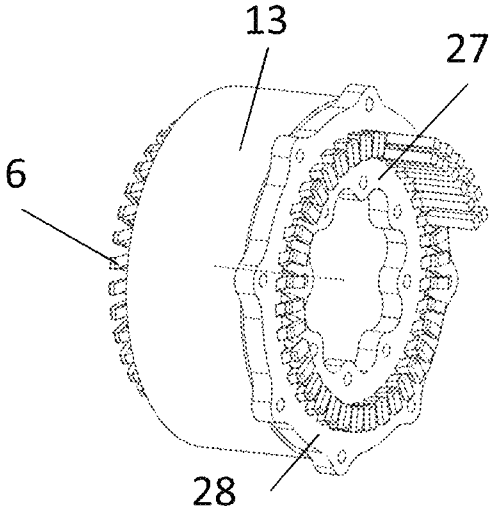
FIG. 6 shows a perspective view of the radial flux double-rotor machine as shown in FIG. 5 in the mounted state.

FIG. 6 shows a perspective view of a radial flux double-rotor machine 10 as shown in FIG. 5 in the mounted state.

The support device 5 is fastened via the bores 9 e.g. in a machine housing as a base 11 and thus carries the torque to the mechanically fixed part of the radial flux double-rotor machine 10. In this manner, the torque produced by the radial flux double-rotor machine 10 is supported effectively. The fastening of the support device 5 is effected via corresponding fastening means, e.g. screws.

The conductor bars 6 of the winding 3 extend axially on both sides to outside the stator core 2 and the first and second rotor 12, 13. The helically arranged conductor bars 6 of the radially inner and outer layer are connected together in each case outside the stator core 2.

In this case, the support elements 27, 28 are illustrated in engagement with the conductor bars 6 of the winding 3. It can be seen that a conductor bar 6 is placed in each support groove 26 so that all conductor bars are form-fittingly coupled to the support device. Therefore, a torque which is supported via the winding 3 can be supported via the support device 5 on the base 11 which is fastened to the bores 9.

Figure 7:
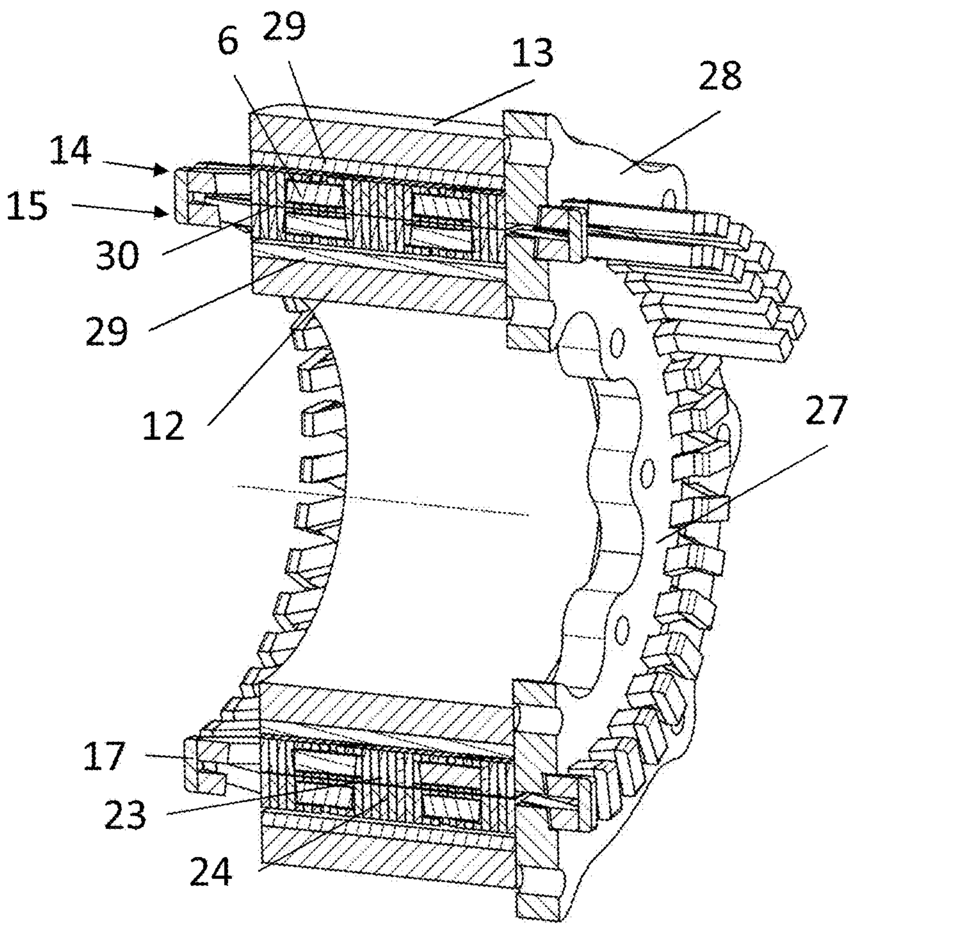
FIG. 7 shows a perspective longitudinal sectional view of a radial flux double-rotor machine according to a still further embodiment.

FIG. 7 shows a perspective longitudinal sectional view of a radial flux double-rotor machine 10 according to a still further embodiment.

This embodiment corresponds substantially to the assembly of a radial flux double-rotor machine 10 shown in FIG. 4, the components of which will be discussed further in detail hereinafter.

The stator core 2 has an inner partial package 23 and an outer partial package 24. The partial packages 23, 24 extend annularly between the first and second rotor 12, 13. The sectional view also makes it possible to see the inner and outer layers 14, 15 of the conductor bars 6 extending within the partial packages 23, 24.

The illustrated radial flux double-rotor machine 10 is a so-called "yokeless" design, in which the yoke does not lie between two teeth in functionally relevant magnetic flux. Therefore, although a stator yoke 30 extends between the conductor bars 6, it serves merely to hold the laminated stator core 18 mechanically together. A radial yoke thickness can be configured correspondingly thinly and, in the illustrated embodiment, amounts by way of example to approximately 10% of the entire radial stator thickness. In addition, with the comparatively small yoke thickness undesired magnetic leakage flux in the yoke is reduced. In further embodiments, the radial yoke thickness can be for this purpose less than 30%, optionally less than 20%, particularly optionally less than 10% of the entire radial stator thickness.

The support device 5 also has an inner support element 27 and an outer support element 28. In this case, it can be clearly seen that the support elements 27, 28 are arranged axially offset with respect to the stator 5 and the rotors 12, 13. Furthermore, at least sections of the form-fitting engagement of the support elements 27, 28 with the conductor bars 6 of the inner and outer layers 14, 15 can be seen.

In this case, it can also be clearly seen that the conductor bars 6 of the inner and outer layers 14, 15 are connected at the conductor bar ends 16 via a radially arranged conductor bar piece 17. The connection is produced optionally as an integrally bonded connection, e.g. by means of laser beam welding.

Furthermore, the surface magnets of the rotors 12, 13 can be seen in cross-section. The first rotor 12 has, on its outer peripheral surface, a plurality of permanent magnets. The second rotor 13 has, on its inner peripheral surface, a plurality of permanent magnets.

A particularly advantageous embodiment is provided if the rotors consist of soft magnetic solid material and are produced having surface-mounted permanent magnets. In this design, the rotors can be manufactured very cost-effectively and a high degree of efficiency can be achieved.

Figure 8:
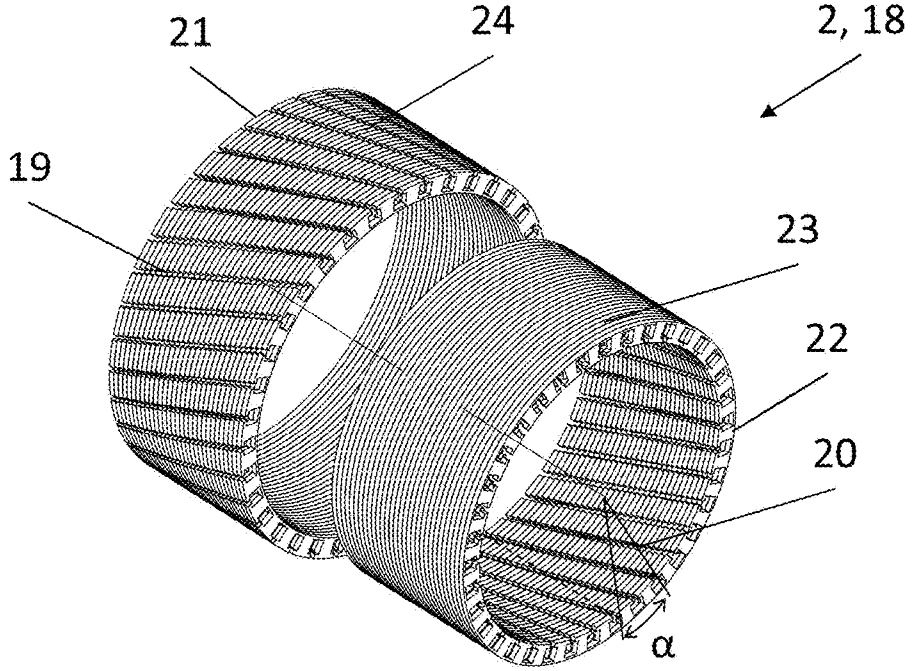
FIG. 8 shows an exploded view of a laminated stator core of a stator core.

FIG. 8 shows an exploded view of the laminated stator core 18 of the stator core 2.

The laminated stator core 18 of the stator core 2 has, as already mentioned, an inner partial package 23 and an outer partial package 24. This serves to simplify the production of the stator grooves 19, which are rotated in opposite directions with respect to one another, with the same inner and outer stator sheets 21, 22 which are stacked in a rotated manner with respect to one another and are provided with recesses at the same locations.

In further embodiments, the stator sheets can also be formed in one part, so that a multiplicity of differently formed stator sheets are provided having differently arranged recesses and are stacked in the sequence necessary for forming the stator grooves. In yet further embodiments, it is also feasible to have completely one-part stator cores 2 which can be manufactured e.g. additively.

In the illustrated two-part design, an inner diameter of the outer partial package 24 is almost equal to the outer diameter of the inner partial package 23. This renders it possible to arrange the inner partial package 23 coaxially within the outer partial package 24.

The partial packages 23, 24 are constructed from individual annular stator sheets 21, 22 which are stacked one on top of the other. The stator sheets 21 of the outer partial package 24 are manufactured with recesses, which are positioned distributed on the outer periphery, in order to form the outer stator grooves 19. The stator sheets 22 of the inner partial package 23 are manufactured with recesses, which are positioned distributed on the inner periphery, in order to form the inner stator grooves 20. For example, manufacture of such stator sheets by punching is advantageous by reason of the edge quality and very low production costs.

The inner and outer stator grooves 19, 20 describe helical lines which extend oppositely with respect to one another with the same pitch and are characterised by the indicated swept angle of the stator grooves a. The swept angle of the stator grooves a can be defined from the angle between the position of the same stator groove on one axial side of the stator core 2 and on the other axial side of the stator core 2 in relation to the centre axis M.

In this case, the stator grooves 19, 20 are designed by way of example as T-grooves having a rectangular recess with a tapered opening. They are provided in particular for receiving conductor bars having a rectangular cross-section in a form-fitting manner. Of course, the geometry of the recesses or stator grooves can be adapted to the conductor geometry. Other cross-sectional shapes would also be feasible for this purpose.

Figure 9:
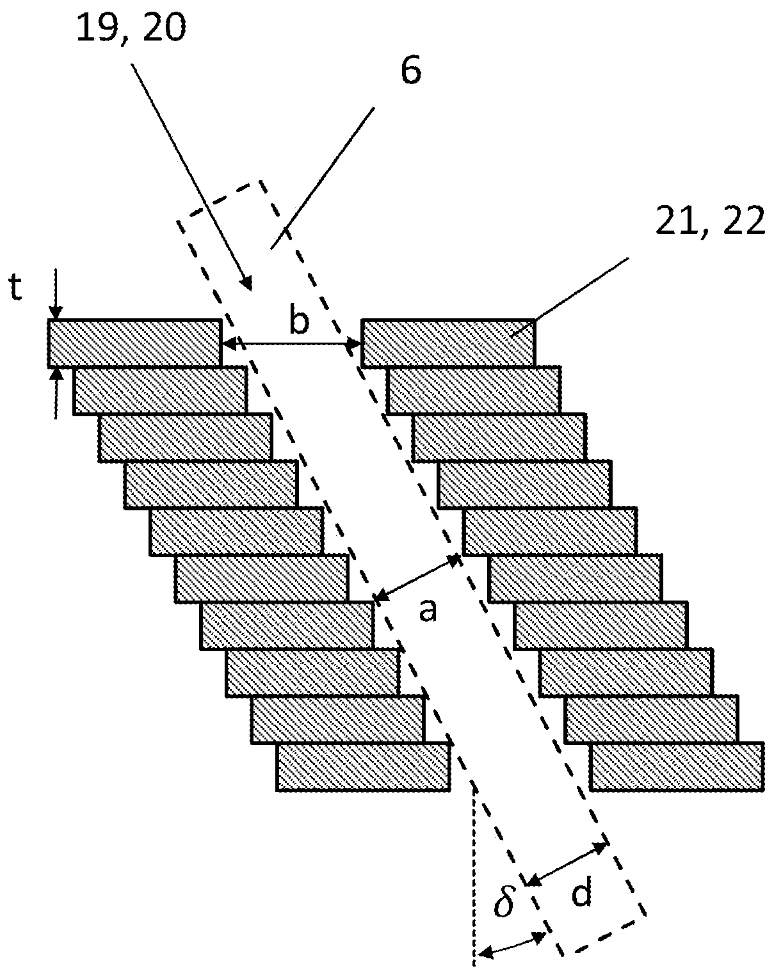
FIG. 9 shows a schematic longitudinal sectional view of a stator groove.

FIG. 9 shows a schematic longitudinal sectional view of a stator groove 19, 20.

The usable or continuous clear width a of the stator grooves 19, 20 within the laminated stator core 18 is substantially equal to the width of the conductor bars 6 received within the stator core 2.

The stator sheets 21, 22 have straight, in particular punched, edges. By reason of the offset of the sheets with respect to one another, a width b of the recesses provided for the stator grooves 19, 20 is larger than the width d of the conductor bars 6 by an amount which is predetermined by the pitch δ of the helical shape of the course and the sheet thickness t.

In FIG. 9, a conductor bar 6 is schematically indicated with dashed lines in the stator groove 19, 20, wherein, in order to provide a clearance fit, the continuous clear width a of the stator groove 19, 20 is slightly larger than the width d of the conductor bar 6 and the width a of the recess in the stator sheet 21, 22 is, in turn, considerably larger than the clear width b.

The sheet thickness t and the setting angle δ of the pitch of the groove course represent a noticeable influencing factor for the difference between the width b of the recess and the clear width a of the usable passage within the groove in the case of straight, e.g. punched, sheet edges. The difference comes about because the pitch angle on the one hand and the staircase-like stepped configuration of the laminated core on the other hand are to be compensated for.

In this case, a minimum size of the width a of the recess for the limit case of infinitely thin sheets, i.e. a pure consideration of the pitch angle δ of the conductor bar, would be $$b=1/\cos(\delta)*d.$$

In order, on the one hand, to compensate for the actual sheet thickness and, on the other hand, to provide a clearance fit which allows the insertion of the conductor bars, the width b of the recess is actually provided to be even larger.

The width b of the recesses shown in FIG. 9 is dimensioned in such a way that a clear width a of the stator grooves 19, 20, which is reduced by the offset between the recesses of the stator sheets, forms a predetermined clearance fit with the width d of a conductor bar 6 to be introduced into the stator groove, but the contact is nevertheless close enough to serve for uniformly distributed power transmission or torque support between the laminated stator core and the winding. Such dimensioning is made possible, inter alia, by virtue of the fact that, on the one hand, each stator sheet is formed identically with a high edge quality and is rotated with the same offset, and, on the other hand, only an individual conductor bar 6 is placed in each stator groove 19, 20, the dimensions of said conductor bar being constant.

In particular, in the illustrated embodiment the conductor bar 6 is a rectangular bar having an edge length or width of several millimetres, e.g. in the range of 2 mm to 6 mm, in particular in the range of 3 mm to 5 mm. Optionally, this can be a rectangular profile of 5 mm×3 mm.

Figure 10:
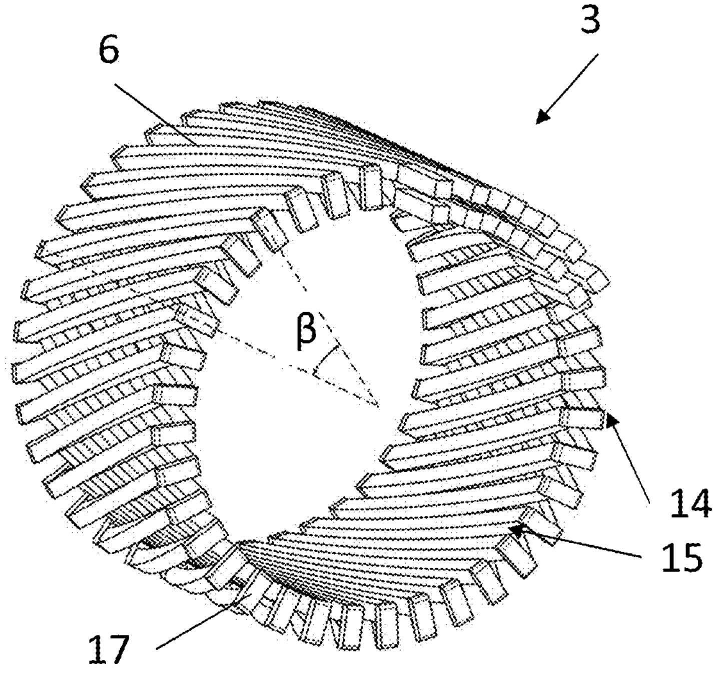
FIG. 10 shows a perspective view of a winding.

FIG. 10 shows a perspective view of a winding 3.

The winding 3 is constructed from said conductor bars 6 which extend helically along the centre axis M. For this purpose, the conductor bars 6 are not only arranged in a correspondingly interlaced manner, but are also twisted in one another according to the helical line course.

The swept angle β of the conductor bars 6 identifies the angle between the start and end of a conductor bar 6 relative to the centre axis M. Since the pitch of the helical line of the conductor bars 6 is equal to the pitch of the helical line of the stator grooves 19, 20, but the conductor bars 6 are longer than the stator grooves, a ratio of the respective swept angles α and β can be formed in order to characterise the geometric relationships, which is also referred to as the pole coverage degree. In order to provide an optimum between magnetic losses and torque utilisation of a radial flux double-rotor machine, this ratio is optionally in a range between 0.6 and 0.75.

The opposed rotation and torsion of the inner and outer radial layers 14, 15 of conductor bars 6 can likewise be seen in this case. The torsion is configured such that the cross-section in relation to a radial line through the centre of the conductor bar is always identical at each point on the conductor rod, as also defined as 2.5 D geometry. Therefore, the conductor bar ends of the inner and outer layers 14, 15 are arranged in an identical orientation one above the other. The conductor bars 6 of the radial inner and outer layers 14, 15 can thus be conductively connected in a simple manner, in this case by way of example via a radially extending conductor bar piece 17 which is welded to the conductor bars 6.

It is to be noted that the winding illustrated here is produced per se not individually but instead always in combination with the stator core 2, which will be discussed in greater detail in relation to FIG. 13.

Figure 11:
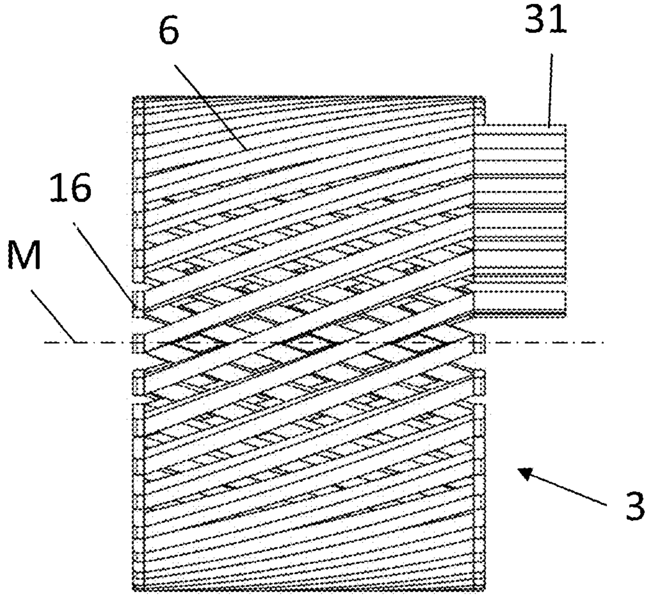
FIG. 11 shows a plan view of a winding.

FIG. 11 shows a plan view of a winding 3.

In this view, it is clear to see the exactly radial orientation of the conductor bars at each point of the helical course thereof which, in the illustrated perspective, is aligned in the region of the centre axis M. The conductor bar ends 16 form in each case the connection point between the inner and outer radial layer 14, 15.

In the illustrated embodiment, the winding has by way of example a total of twelve connection contacts 31. In the case of a three-strand interconnection, a three-phase operation is optionally provided. However, the winding can be adapted in a manner known to a person skilled in the art to other interconnections to form a rotational field-generating winding with any number of strands.

Figure 12:
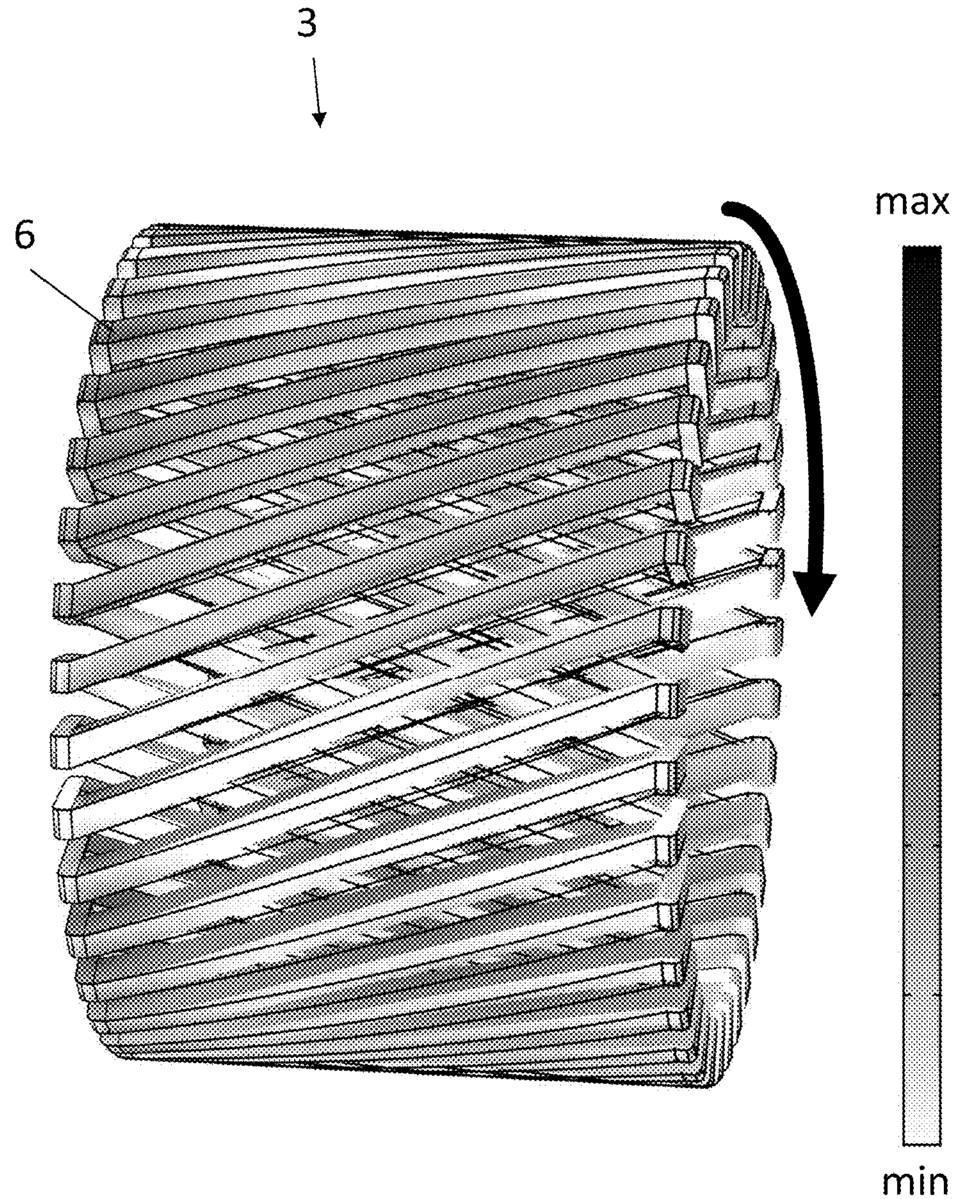
FIG. 12 shows a perspective view of an FEM simulation of a winding under load.

FIG. 12 shows a perspective view of an FEM simulation of a winding 3 under load.

With minor simplifications for simulation purposes, this is essentially the winding geometry illustrated in FIG. 10. The scale illustrated relates to the stresses within the winding, wherein, by way of example, in the case of a rectangular profile of the conductor bars 6 of 5 mm×3 mm, this can be a scale of 0 MPa to 30 MPa.

In this example, the conductor bar ends are defined by means of a swept angle of the conductor bars β>0, i.e. helically arranged and formed or formed in a correspondingly twisted manner. At the axial end, on which the support device engages, a maximum torque of the correspondingly dimensioned radial flux double-rotor machine 10, as indicated by a thick arrow, is plotted, wherein, by way of example, in the case of a rectangular profile of the conductor bars 6 of 5 mm×3 mm, this can be about 5000 Nm.

It is evident that the stresses within the winding are distributed very homogeneously by reason of the helical line geometry. In spite of the set significant exaggeration, a deformation can scarcely be seen. Therefore, by reason of this design stress peaks and thus also the deformation are considerably reduced.

By reason of the bar structure-like construction, a high torque can thus be absorbed by the winding 3 in a self-supporting manner when fixing an axially accessible winding end, without causing unacceptably large deformations and/or stress states. This can be attributed in particular to the fact that in the bar structure, the conductor bars 6 predominantly absorb tensile and compressive stresses when subjected to tangential force.

When compared to designs with axis-parallel, straight conductors, the mechanical stresses can thus be significantly reduced.

Figure 13:
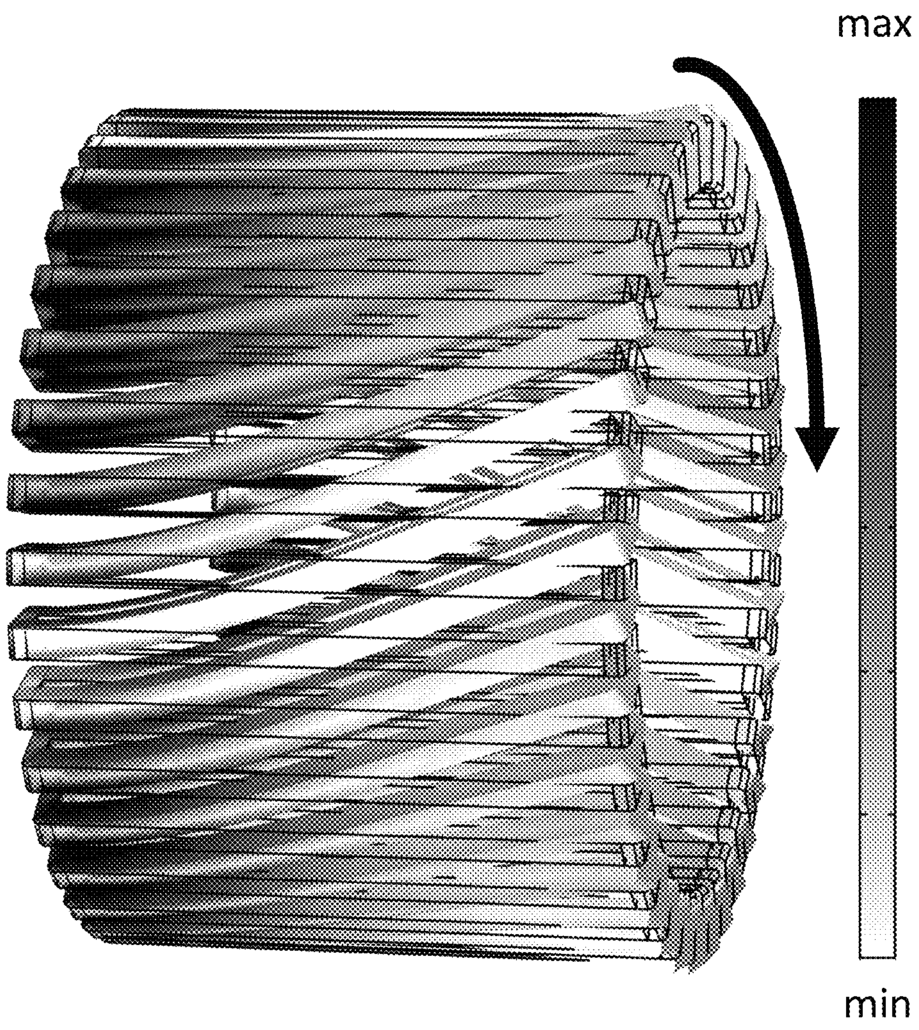
FIG. 13 shows a perspective view of an FEM simulation of a comparative winding under load with the conductor bars having a straight design.

FIG. 13 shows a perspective view of a comparative model with a straight design and axial course of the conductor bars 6 under load.

In comparison with FIG. 12, by reason of the straight design and the axial course of the conductor bars, a stress course concentrated on the side illustrated in FIG. 12 on the left and a strong deformation of the conductor bars resulting from the locally high stress with a large deflection on the side illustrated in FIG. 13 on the right can be seen. Here, the same stress scale and the same exaggeration in deformation are set as in FIG. 12, which shows the effect of the different structural arrangements on the torsion stiffness.

Figure 14:
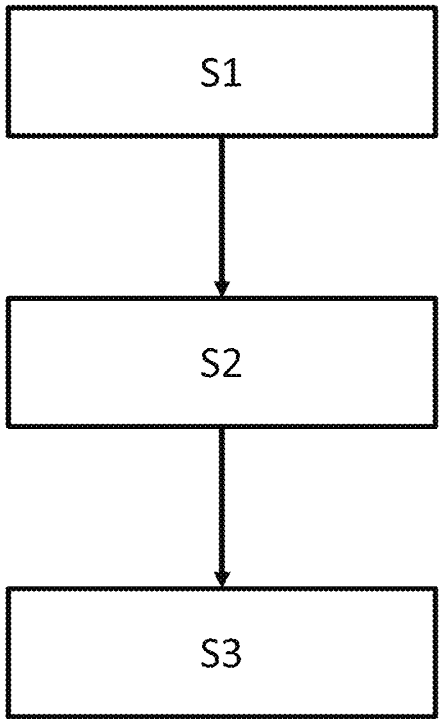
FIG. 14 shows a flow diagram of a method for producing a stator.

FIG. 14 shows a flow diagram of a method for producing a stator 1.

The method comprises a first step of providing S1 a stator core 2 having radially outer stator grooves 19 each describing a helical line and radially inner stator grooves 20 each describing a helical line with an opposite turning direction. A further step concerns introducing S2 individual conductor bars 6 following the helical lines through the inner and outer stator grooves 19, 20. The conductor bars are introduced in particular in an axial direction. Furthermore, a step is provided of connecting S3 the conductor bars 6, which are introduced into the inner and outer stator grooves, on the conductor bar ends 16 in order to form conductor loops.

Although the present invention has been described in full above with the aid of exemplified embodiments, it is not limited thereto but can be modified in diverse ways.

LIST OF REFERENCE SIGNS

1 stator
2 stator core
3 winding
4 axial end
5 support device
6 conductor bar
7 first limb
8 second limb
9 bore
10 radial flux double-rotor machine
11 base
12 first rotor
13 second rotor
14 radially outer layer
15 radially inner layer
16 conductor bar ends
17 conductor bar piece
18 laminated stator core
19, 20 stator grooves
21, 22 stator sheets
23 inner partial package
24 outer partial package
25 support element
26 support grooves
27 inner support element
28 outer support element
29 permanent magnet
α swept angle of the stator grooves
β swept angle of the conductor bars
δ pitch
a clear width
b width of the recess
d width of a conductor bar
M centre axis
t sheet thickness

The invention claimed is:

1. A stator for a radial flux double-rotor machine, comprising:

a stator core, wherein the stator core contains a laminated stator core with stator grooves extending helically corresponding to the winding course, wherein an individual conductor bar is arranged in each stator groove of the laminated stator core;

a winding which is placed in the stator core and is designed to be self-supporting for torque support of the stator, wherein the winding protrudes beyond the stator core at least one axial end, is formed from conductor bars which are connected together in the manner of a bar structure, and has a radially inner layer of helically arranged conductor bars and a radially outer layer of oppositely helically arranged conductor bars, wherein an angle swept by the stator grooves in each case is smaller than an angle swept by the conductor bars in each case; and a support device which is arranged axially offset with respect to the stator core and is designed for form-fitting engagement with the winding at the at least one axial end for torque support.

2. The stator of claim 1, wherein the winding is designed to be torsionally stiff such that a torque acting upon the stator core during the operation of a radial flux double-rotor machine can be supported via the torsionally stiff winding on the support element.

3. The stator of claim 1, wherein the stator core is designed to carry a primarily radial magnetic flux.

4. The stator of claim 3, wherein the stator core has a radial yoke thickness which is at least one of less than 30%, less than 20% or less than 10% of an overall radial stator core thickness.

5. The stator of claim 1, wherein the radially inner layer and the radially outer layer of the winding have in each case the thickness of an individual conductor bar.

6. The stator of claim 1, wherein the conductor bars are each twisted corresponding to the helical course such that a cross-section of a conductor bar is the same at each point of the conductor bar in relation to a radial axis of the cross-section.

7. The stator of claim 6, wherein the support grooves follow, at least in sections, the helical course of the twisted conductor bars.

8. The stator of claim 1, wherein the conductor bars of the radially inner and outer layer associated with the same phase of the winding are connected together in each case at the conductor bar ends.

9. The stator of claim 1, wherein the stator sheets of the laminated stator core are each formed identically with recesses provided for forming the stator grooves, wherein the helical course of the stator grooves is provided by means of a stacking of the stator sheets twisted with respect to one another.

10. The stator of claim 9, wherein the laminated stator core contains an inner partial package with radially inner stator grooves and an outer partial package with radially outer stator grooves, wherein the stator sheets of the inner partial package are designed having an identical geometry in each case and the stator sheets of the outer partial package are designed having an identical geometry in each case, and wherein the stator sheets of the inner partial package and the stator sheets of the outer partial package are stacked in a manner twisted oppositely with respect to one another.

11. The stator of claim 1, wherein the stator sheets are each formed differently with recesses provided for forming the stator grooves, wherein the helical course of the stator grooves is provided by means of different spaced intervals of the recesses in the individual stator sheets.

12. The stator of claim 11, wherein the recesses for radially inner and radially outer stator grooves are each integrally formed in a common stator sheet, wherein the oppositely helical course of the radially inner and radially outer stator grooves is provided by a continuous displacement of the inner and outer stator grooves with respect to one another from stator sheet to stator sheet.

13. The stator of claim 9, wherein the stator sheets have straight edges, wherein a width of the recesses provided for the stator grooves is larger than the width of the conductor bars by an amount predetermined by the pitch of the helical shape of the course and the sheet thickness, so that a clear width of the stator grooves reduced by the offset between the recesses of the stator sheets corresponds substantially to the width of a conductor bar.

14. The stator of claim 1, wherein a ratio of the angle swept by the stator grooves in each case to the angle swept by the conductor bars in each case is in a range between 0.6 and 0.8.

15. The stator of claim 1, wherein the support device has a support element, in which support grooves are provided which correspond to the helical arrangement of the conductor bars and are in engagement with the conductor bars.

16. The stator of claim 15, wherein the support device has a radially inner support element for engagement with the radially inner layer of the conductor bars, and has a radially outer support element for engagement with the radially outer layer of the conductor bars.

17. A radial flux double-rotor machine, comprising:

a mechanically fixed base;

a stator comprising a stator core, wherein the stator core contains a laminated stator core with stator grooves extending helically corresponding to the winding course, wherein an individual conductor bar is arranged in each stator groove of the laminated stator core, a winding which is placed in the stator core and is designed to be self-supporting for torque support of the stator, wherein the winding protrudes beyond the stator core at least one axial end, is formed from conductor bars which are connected together in the manner of a bar structure, and has a radially inner layer of helically arranged conductor bars and a radially outer layer of oppositely helically arranged conductor bars, wherein an angle swept by the stator grooves in each case is smaller than an angle swept by the conductor bars in each case, and a support device which is arranged axially offset with respect to the stator core and is designed for form-fitting engagement with the winding at the at least one axial end for torque support;

wherein the support device is in form-fitting engagement with the at least one axial end of the winding for torque support and is supported on the base;

a first rotor arranged radially inside the stator core; and a second rotor arranged radially outside the stator core.

18. The radial flux double-rotor machine of claim 17, wherein the support device contains a heat-conducting material, wherein the base has a heat sink which is designed to absorb heat dissipated from the stator via the support device.

19. The radial flux double-rotor machine of claim 17, wherein a predetermined number of pole pairs are provided both on the first rotor and on the second rotor, wherein an angle swept by the conductor bars of the winding in each case is designed to form a conductor loop per pole.

20. A method for producing a stator for a radial flux double-rotor machine, comprising the steps of:

providing a stator core having radially outer stator grooves each describing a helical line and radially inner stator grooves each describing a helical line with an opposite turning direction;

introducing individual conductor bars following the helical lines through the inner and outer stator grooves; and connecting the conductor bars, which are introduced into the inner and outer stator grooves, on the conductor bar ends in order to form conductor loops.

21. The method of claim 20, wherein providing the stator core comprises producing a laminated stator core, wherein individual stator sheets which have recesses for forming stator grooves are stacked in a twisted manner with respect to one another.

22. The method of claim 21, wherein the laminated stator core contains an inner partial package and an outer partial package, wherein all stator sheets of the inner partial package are designed having an identical geometry in each case and all stator sheets of the outer partial package are designed having an identical geometry in each case, and wherein the stator sheets of the inner partial package for forming the inner stator grooves and the stator sheets of the outer partial package for forming the outer stator grooves are stacked in a manner twisted oppositely with respect to one another.

23. The method of claim 21, wherein the laminated stator core has a large number of differently formed stator sheets, wherein the recesses for the inner and outer stator grooves are integrated in each case in a common stator sheet, and wherein the pitch of the helical line is achieved by means of a continuous displacement of the inner and outer stator grooves with respect to one another from stator sheet to stator sheet.

* * * * *